United States Patent
Martin et al.

[11] Patent Number: 5,490,967
[45] Date of Patent: Feb. 13, 1996

[54] LOW HEAT RELEASE POLYMERIC COMPOSITES

[75] Inventors: Patrick H. Martin, Danville, Calif.; Stephen E. Bales, Midland, Mich.; Peter K. Kim, Danville, Calif.; Ritchie A. Wessling, Midland, Mich.

[73] Assignee: The Dow Chemical Company, Midland, Mich.

[21] Appl. No.: 371,332

[22] Filed: Jan. 11, 1995

Related U.S. Application Data

[62] Division of Ser. No. 245,152, May 17, 1994, Pat. No. 5,419,957.

[51] Int. Cl.⁶ ............................................. B32B 5/24
[52] U.S. Cl. ................................. 264/322; 264/348
[58] Field of Search .............................. 264/322, 348

[56] References Cited

U.S. PATENT DOCUMENTS

| | | | |
|---|---|---|---|
| 3,617,594 | 11/1971 | Willy | 264/45 |
| 3,621,092 | 11/1971 | Hofer | 264/322 |
| 3,865,661 | 2/1975 | Hata et al. | 156/79 |
| 4,113,908 | 9/1978 | Shinomura | 428/113 |
| 4,426,470 | 1/1984 | Wessling et al. | 524/35 |
| 4,515,656 | 5/1985 | Memeger, Jr. | 162/101 |
| 4,643,940 | 2/1987 | Shaw et al. | 428/308.4 |
| 4,670,331 | 6/1987 | Radvan et al. | 428/303 |

FOREIGN PATENT DOCUMENTS

| | | |
|---|---|---|
| 1129757 | 10/1968 | United Kingdom . |
| 1329409 | 9/1973 | United Kingdom . |

*Primary Examiner*—Sam Silverberg

[57] ABSTRACT

This invention relates to a low heat release, low density, fiber-reinforced composite comprising a matrix comprising a thermoplastic polymer selected from the group consisting of polyarylsulfone, polyethersulfone, polyetheretherketone, polyetherketoneketone, a copolycarbonate of 4,4'-thiodiphenol and at least one member of the group consisting of bisphenol A, 9,9-bis(4-hydroxyphenyl) fluorene, and 1,1-bis-(4-hydroxyphenyl)-1-phenyl ethane, a copolycarbonate of bisphenol A and 9,9-bis(4-hydroxyphenyl) fluorene, 1,1-bis(4-hydroxyphenyl)-1-phenyl ethane polycarbonate, bisphenol A polycarbonate, and polyetherimide, and from about 10 to about 70 percent by weight of the composite of randomly oriented reinforcing fibers, less than 0.5 inch in length, distributed throughout the matrix. The matrix has a void volume of from about 20 to about 90 percent by volume. The composite has a thermoplastic skin layer on each of the major surfaces thereof. A process for making the composite is also disclosed.

18 Claims, No Drawings

LOW HEAT RELEASE POLYMERIC COMPOSITES

REFERENCE TO RELATED APPLICATIONS

This application is a divisional of U.S. application Ser. No. 08/245,152, filed on May 17, 1994 now U.S. Pat. No. 5,419,957.

This invention relates to low heat release fiber-reinforced composites.

BACKGROUND OF THE INVENTION

Low density, fiber-reinforced composites are known and described in U.S. Pat. No. 4,643,940. These composites have high flexural stiffness compared to conventional cellular plastics and are useful in the preparation of shaped articles, in particular, load bearing articles. These composites exhibit significant sound and heat insulating properties.

There is a continuing effort to improve the properties of these materials to expand their utility to fulfill the need for fire blocking materials in transportation and construction industries.

An object of the invention is to provide fiber-reinforced composites which have high fire resistance, low flammability, minimum smoke release, and excellent thermoformability with low processing costs.

SUMMARY OF THE INVENTION

It has been found that the composite of the invention is such a composite.

In one aspect, the present invention relates to a low heat release, low density, fiber-reinforced composite comprising: (a) a matrix which comprises a solid thermoplastic polymer selected from the group consisting of polyarylsulfone, polyethersulfone, polyetheretherketone, polyetherketoneketone, a copolycarbonate of 4,4'-thiodiphenol and at least one member of the group consisting of bisphenol A, 9,9-bis(4-hydroxyphenyl) fluorene, and 1,1-bis(4-hydroxyphenyl)-1-phenyl ethane, a copolycarbonate of bisphenol A and 9,9-bis(4-hydroxyphenyl) fluorene, 1,1-bis(4-hydroxyphenyl)-1-phenyl ethane polycarbonate, bisphenol A polycarbonate, and polyetherimide; (b) from about 10 to about 70 percent by weight of the composite of randomly-oriented reinforcing fibers distributed throughout the matrix, the fibers having an average length of less than about 0.5 inch and an aspect ratio of at least about 40; the matrix having a void volume of from about 20 to about 90 percent by volume and being prepared by heating a densified fiber-reinforced polymer sheet to a temperature above the softening temperature of the thermoplastic polymer, whereby the sheet is expanded in a direction perpendicular to that of a plane defined by the sheet, and (c) a thermoplastic skin layer laminated on each major surface thereof.

In another aspect, the present invention relates to a process for preparing a low heat release, low density, fire-reinforced composite having a void volume of from about 20 to about 90 percent, comprising: (a) heating a densified fiber-reinforced polymer sheet with a thermoplastic skin layer laminated on each major surface thereof, to a temperature above the softening temperature of the thermoplastic polymer, whereby the sheet is expanded in a direction perpendicular to that of a plane defined by the sheet, and (b) cooling the expanded sheet below the softening temperature thereof to form a low heat release, low density, fiber-reinforced composite having a thermoplastic skin layer laminated on each major surface thereof.

In still another aspect, the present invention relates to a process for preparing a low heat release, low density, fiber-reinforced composite having a void volume of from about 20 to about 90 percent, comprising: (a) heating a densified fiber-reinforced polymer sheet to a temperature above the softening temperature of the thermoplastic polymer, whereby the sheet is expanded in a direction perpendicular to that of a plane defined by the sheet, (b) cooling the expanded sheet below the softening temperature thereof to form a low heat release, low density, fiber-reinforced composite and (c) laminating a thermoplastic skin layer on each major surface thereof.

The composites of the invention can be made decorative by embossing the surface during densification, thermoforming or by laminating a decorative layer simultaneously during the thermoforming process. The composites of the invention are desirable in the transportation and construction industries for their low heat release properties.

The composite of this invention may be prepared having selected areas of low density (lofted) and high density (unlofted) material. This "selectively lofted" material is especially useful in applications where a generally low density material is desired but stronger or tougher high density regions are needed such as for attaching the part of another component, or for regions of wear and the like.

DETAILED DESCRIPTION OF THE INVENTION

The composites of this invention comprise a high void volume matrix comprising a thermoplastic polymer. Distributed throughout the matrix are reinforcing fibers which comprise from about 10 to about 70 percent, preferably 20 to 60 percent and more preferably 25 to 50 percent by weight of the composite.

By "high void volume" it is meant that the composite has a void volume, i.e., the volume of the composite which is air space, from about 20 to about 90 percent, preferably about 30 to about 70 percent, and more preferably from about 50 to about 70 percent by volume of the composite. Such void volumes correspond approximately to an expansion of about 20 to 500 percent, preferably 50–300 percent, in thickness during the preparation of the composite from a densified sheet as described hereinafter.

Although the areal density of the composite will depend on the particular resin and fiber employed therein, the areal density of the composite of the invention is less than 3.0 g/square inch, preferably less than 2.0 g/square inch, and more preferably less than 1.75 grams/square inch.

The thermoplastic polymers for the continuous matrix generally have Limited Oxygen Index (LOI) of greater than 23. The LOI represents the minimum concentration of oxygen, expressed as volume percent, in a mixture of oxygen and nitrogen that will just support flaming combustion of the thermoplastic polymer initially at room temperature and is measured according to ASTM Test Method D-2863. The thermoplastic polymer is generally selected from the group consisting of polyarylsulfone, polyethersulfone, polyetheretherketone, polyetherketoneketone, a copolycarbonate of 4,4'-thiodiphenol and at least one member of the group consisting of bisphenol A, 9,9-bis(4-hydroxyphenyl) fluorene, and 1,1-bis(4-hydroxyphenyl)-1-phenyl ethane, a copolycarbonate of bisphenol A and 9,9-bis(4-hydroxyphenyl) fluorene, 1,1-bis(4-hydroxyphenyl)-

1-phenyl ethane polycarbonate, bisphenol A polycarbonate, and polyetherimide. More preferably, it is polyarylsulfone. The copolycarbonates of 4,4'-dithiophenol and 9,9-bis(4-hydroxyphenyl) fluorene and 1,1-bis(4-hydroxyphenyl)-1-phenyl ethane, respectively, are described in commonly assigned Patent Application WO 94/02533, publication date: Feb. 3, 1994.

The composite of the invention is advantageously prepared from a densified fiber-reinforced polymer sheet. Since the individual fibers significantly overlap in such sheet, the densification process tends to cause the fibers to bend slightly where they overlap. It is believed, although it is not intended to limit the invention to any theory, that in the lofting process described hereinafter, the bent fibers straighten, aiding in the lofting and expansion of the sheet. For this reason, it is necessary that the flexural modulus of the fiber, under the conditions of the lofting of the sheet, be greater than the modulus of the continuous polymer matrix.

The fibers employed herein have an average length of less than about 0.5 inch, preferably having an average length from about 0.25 inch to about 0.125 inch. The fibers have an aspect ratio (length to diameter ratio) of at least about 40, preferably at least about 100. The reinforcing fibers are essentially uniformly dispersed throughout the polymer matrix and are randomly oriented in the plane defined by the composite, i.e., there is substantially no alignment of the fibers in any particular direction within the plane.

Suitable fibers for the purpose of this invention must be non-combustible or thermally resistant fibers like glass fibers, particularly E-glassy and the like, metallized glass fibers, especially aluminized glass fibers, ceramic fibers, carbon fibers, graphite fibers, nickel-coated graphite fibers, and polyamide fibers, polybenzimide, polybenzoxazol, polybenzathiazol, and the like. Of these, glass and carbon are generally preferred for most applications in the transportation and building industries.

The composite of the invention is laminated with a skin layer on each of the two major outer surfaces of the composite. The skin layers improve fire-blocking and low heat release properties of the composite of the invention. The skin layers comprise a thermoplastic polymer which may be the same as the thermoplastic polymer of the matrix. Generally, the thermoplastic polymer of the skin may be chosen from polyethersulfone, polyarylsulfone, polyvinylidene fluoride, polyetheretherketone, polyetherketoneketone, and polyetherimide. Preferably, the thermoplastic polymer of the skin layer is polyethersulfone or polyvinylidene fluoride.

The skin layers may vary in thickness from about 2 mils to about 6 mils (0.05 mm to 0.15 mm). More preferably, the skin layer is about 3 mil (0.075 mm) in thickness. The skin layers impart the low heat release and fire-blocking properties by minimizing the airflow into the composite, By minimizing the air flow into the composite during the fire, the composite can take full advantage of the anaerobic void spaces as an insulation to enhance the fire-blocking capacity of the composite.

The low heat release and fire-blocking properties of the composites of the invention may be further enhanced by sealing all the edges of the composite with mechanical fasteners, like staples, or non-combustible tapes, like aluminum foil tape. The sealed edges prevent the airflow into the composite.

Various optional components are also advantageously employed in the composite of the invention. In the preferred method for making the composite, it is generally necessary to employ a polymeric binder. Suitable binders include polymeric latexes of substantially water-insoluble organic polymers having bound anionic or cationic charges, such as acrylic or styrene/butadiene polymers containing bound sulfonium, sulfoxonium, isothiouronium, pyridinium, quaternary ammonium, sulfate, sulfonate or carboxylate groups. Latex binders which are suitable for use in the preferred method are described in U.S. Pat. No. 4,426,470, which is incorporated by reference.

In a preferred method of making the composite of the invention, generally a solid flocculant is added. Suitable flocculant include aluminum polychloride (aluminumhydroxychloride) or diverse organic flocculants such as partially hydrolyzed polyacrylamide, modified cationic polyacrylamide, and diallyldiethylammonium chloride. The flocculent is typically present in relatively-small amounts (i.e., less than about 5, preferably less than 3 percent by weight of the composite of the invention).

A blowing agent is optionally employed in preparing the composite of the invention. Such blowing agents may be an inert gas such as carbon dioxide, argon, neon, oxygen, nitrogen, and the like, or a lower boiling hydrocarbon such as various halogenated, particularly fluorinated, hydrocarbons. Alternatively, a chemical blowing agent may be employed. Suitable chemical blowing agents include various carbonates, bicarbonates, nitrates, alkali borohydrides, peroxides, urea, and azo compounds. The use of a blowing agent tends to favor the formation of a closed-cell low density composite.

The composite of the invention may also optionally contain minor amounts of a filler such as silicon dioxide, calcium carbonate, magnesium oxide, cellulosic fibers such as wood pulp, magnesium hydroxide, calcium silicate and mica. Pigments or dyes may also be added to impart opacity and/or color. Various chemical additives such as antioxidants, UV stabilizers, thickeners, bacteriocides and the like may also be added.

The low heat release, low density composite of the invention is prepared by either (a) laminating a low density composite on each of the major surfaces with a skin layer comprising a thermoplastic polymer described hereinabove, or by (b) applying a skin layer to each of the major surfaces of the polymer sheet during the densification process or laminating a densified sheet obtained after the densification process as described below.

The low density composite is prepared from a densified fiber-reinforced polymer sheet, which is described in U.S. Pat. No. 4,426,470, incorporated herein by reference. The densified fiber-reinforced polymer sheet is then lofted to prepare the low density composite by the methods described in U.S. Pat. No. 4,643,940, which is incorporated herein by reference.

The densified sheet is generally characterized as having a continuous matrix comprising a thermoplastic polymer in which are distributed substantially unbroken reinforcing fibers as described hereinbefore. The fibers are randomly oriented in two dimensions in a plane defined substantially by the densified sheet. By "densified" it is meant that the sheet has a void volume of no greater than 20 percent of the total volume of the sheet. Such densified sheet is advantageously prepared using a paper-making process followed by densification under pressure as described, for example, in Example 6 of U.S. Pat. No. 4,426,470, or a similar process.

If desired, two or more of the polymer sheets prepared by the process described in U.S. Pat. No. 4,426,470 may be laminated together and used to prepare the low density composite of the invention. If a densified sheet with more than one polymer sheet is used as the starting material, it is possible to selectively loft only some of the layers to provide a product having both low density and high density layers.

In the process of the invention, the densified polymer sheet is heated above the softening temperature of the thermoplastic polymer matrix, whereby the sheet is expanded in a direction perpendicular to the plane of the sheet, i.e., the thickness of the sheet is increased. The heating is performed in the absence of pressure which prevents the expansion of the sheet.

Heating can be done using an ordinary forced air oven, or preferably radiation such as in an infrared oven or a microwave radiation oven if the thermoplastic polymer or other component of the sheet is sensitive to microwaves. Advantageously, the densified sheet is heated slightly (for example, from about 5°–250° F.) above the softening temperature of the polymer matrix. Excessive heating causes degradation of the polymer. Since, during conductive heating, the exterior portion of the sheet is normally at a higher temperature than the interior portion, it is generally necessary to avoid overheating the exterior portion of the densified sheet. It is generally preferred that the surface temperature be not more than about 150° F greater than the core temperature and, in any event, less than a temperature at which the polymer degrades.

Typically, depending upon the particular composition of the densified polymer sheet and the thickness thereof, the lofting occurs within about 10–600 seconds, more generally about 30–180 seconds of heating. The time required is generally inversely related to the temperature employed.

The amount of expansion of the sheet can be controlled, if desired, by the use of a mold or by expanding the sheet between two surfaces which define a desired thickness. In the absence of such mold or surfaces, the sheet generally expands 200–300 percent of its original thickness. To obtain thinner composites, a mold having a smaller depth or two surfaces defining a small thickness is employed. Alternatively, the heating can be controlled so that only the surface of the densified sheet loft, or only one side, is lofted.

Following the expansion or lofting of the sheet material to the desired thickness, the lofted composite is cooled advantageously under slight pressure below the softening point of the polymer to form a low density fiber-reinforced polymer composite.

The thickness of the low density composite is controllable by the thickness of the polymer sheet employed as a starting material. In addition, the thickness of the low density composite is controllable by the manner in which heat is applied to soften the resin sheet.

The composite may be selectively lofted, i.e., only portions of the densified sheet are lofted. Applicants have found that in the heating and cooling steps of the lofting process, application of relatively low pressure (i.e., 10 to 200 psi) to the sheet substantially reduces or prevents the lofting of the sheet. Accordingly, by continuously applying the pressure to desired portions of the sheet during the heating and cooling steps, there is obtained a low density composite containing areas of densified or partially densified material. The same effect is achieved by heating only selected areas of the densified sheet. Such areas of densified material are useful, for example, at areas of wear or at points in the low density composite where it is to be fastened to another article, especially by use of nails, rivets, bolts, screws, or the like. The densified area is significantly tougher than the expanded area, thereby affording a stronger, more permanent fastening point.

Typically, the skin layer is included in the densification step or it can be laminated onto the densified composite sheet or low density composite by the methods known to one skilled in the art. Typically, the composite is placed between the thermoplastic polymer films and consolidated together by heating to form a resin-rich skin on both surfaces. The heating time is dependent upon the softening temperature of the thermoplastic polymer and the temperature employed. Generally, heating is done for about less than five minutes at temperatures less than about 550° F.

The composite of the invention can be embossed with decorative designs on both the major surfaces during the thermoforming process or a decorative layer can be laminated simultaneously during the thermoforming process.

The low heat release composites of the invention exhibit excellent heat insulating and fire-blocking blocking properties as well as low smoke release. The maximum rate of heat release (MRHR) and two minute total heat release (THR) values, as measured in a FAA certified Ohio State University Calorimeter, are generally less than 65 kW/m$^2$ and 75 kW/min/m$^2$, respectively. Preferably, the MRHR and THR values are less than 60 kW/m$^2$ and 70 kW/min/m$^2$, respectively.

The following examples are provided to illustrate the invention and are not intended to limit the scope thereof. All parts and percentages are by weight unless otherwise indicated.

EXAMPLES 1–6

A fiber-reinforced polymer sheet was made with the wet laid process described in Example 1 of U.S. Pat. No. 4,426,470. The sheet comprised 40 percent by weight of 0.125 inch chopped carbon fiber, 3.5 percent by weight of anionic latex, 3 percent by weight of KEVLAR* pulp, 53 percent by weight of polyethersulfone (PES) powder, commercially available from Imperial Chemical Industries, and a trace of a modified cationic polyacrylamide flocculant.

After the sheet was formed and dried at 110° C. for about 4 to 6 hours, a low-density composite was fabricated by first heating a stack of 6"×6" sheets, having a total weight of about 30 grams, at 50 psi and 288° C. for two minutes with a heating press and then consolidating into a densified sheet at 288° C. and 500 psi for 2.5 minutes in accordance with Example 6 of U.S. Pat. No. 4,426,470, incorporated herein by reference. The densified polymer sheet can then be lofted in a press at 288° C. by inserting a lofting bar of desired thickness and closing the press. Metal plates with release spray coating or Teflon release cloths are used to prevent the composite from sticking to the press. The densified sheet can also be lofted by the method described in Example 1 of U.S. Pat. No. 4,643,940.

The low heat release low density fiber-reinforced reinforced composite of the invention was obtained by laminating the low-density composite obtained above on each of its major surfaces with a thermoplastic film, for example, polyethersulfone about 3 mil in thickness. The lamination was achieved by placing the low-density composite in between the polyethersulfone films and consolidating them together by heating in order to form a resin-rich skin on both sides.

In a typical process for manufacturing the composites of the invention, the polymer sheets with skin layers on each of the major surfaces are placed between aluminum panels coated with mold release and placed on a compression molding press platen. The press is closed and pressured to 20 psi and heated to 520° F. At 520° F., pressure is increased to 100 psi for about five minutes. The press is opened and shims are placed on the bottom platen. The mold is closed and the pressure is maintained at 20 psi for about five minutes. The thickness of the shim is dependent on the desired thickness of the panel. The densified sheet expands to the thickness of the shim during this step of the process. The press is then cooled to about 300° F., while maintaining pressure at about 20 psi.

The composites of Examples 2–6 of the invention were prepared and tested in the manner described above. The composites of Examples 1–6 were about 4.3 mm in thickness and had density from about about 0.25 to about 0.4 gm/cc.

COMPARATIVE EXAMPLES 7–8

Comparative Examples 7–8 using different thermoplastic matrix polymers and different fibers were prepared in the manner described above.

The composites of Examples 1–6, and Comparative Examples 6–9 were cut into 6"×6" squares and tested by FAA certified Ohio State Heat Calorimeter at Ohio State University for maximum rate of heat release and for 2 minute total heat release. The results of the Ohio State Heat Release Test for different compositions are set forth in Table I below.

were prepared in the manner described above. The composites comprised about 30 percent by weight of fibers, 3 percent by weight of Kevlar* pulp, 3.5 percent by weight of styrene-butadiene latex with bound charges, 0.5 percent by weight of a flocculent Betz* 1260, available from Betz Laboratories, Trevose, Pa. U.S.A., (diluted to 0.17 percent solids), with the balance being the weight percent of the matrix thermoplastic polymer. The composites were tested for THR and MRHR and the results are set forth in Table II below.

TABLE I

| Sample | 1 | 2 | 3 | 4 | 5 | 6 | 7 | 8 |
|---|---|---|---|---|---|---|---|---|
| Matrix Polymer | Polyether Sulfone | Polyphenylene sulfide | Polyaryl-sulfone | Polyether-imide | TDP-BA* | Bis A PC** | Polypropylene | Polypropylene |
| Wt. % | 53.5 | 53.5 | 53.5 | 48.5 | 53.5 | 63.5 | 53.5 | 43.5 |
| Fiber | carbon | glass | carbon | glass | carbon | carbon | glass | carbon |
| Wt. % | 40 | 40 | 40 | 45 | 40 | 30 | 40 | 20 |
| Latex Wt. % | 3.5 | 3.5 | 3.5 | 3.5 | 3.5 | 3.5 | 3.5 | 3.5 |
| Kevlar ® Pulp Wt. % | 3.0 | 3.0 | 3.0 | 3.0 | 3.0 | 3.0 | 3.0 | 3.0 |
| Mg(OH)$_2$ Wt. % | — | — | — | — | — | — | — | 30 |
| LOI of Matrix Polymer | 38 | 44 | 33 | 47 | 47 | 27 | 18 | 20 |
| 2 min THR (kW-min/m$^2$) | 26.8 | 29.6 | 28.3 | 47.3 | 67 | 73 | 103 | 93 |
| MRHR (kW/m$^2$) | 24.3 | 26.3 | 27.6 | 31.7 | 46 | 59 | 80 | 70 |

*TDP-BA - 4,4'-thiodiphenol-bisphenol A (75/25 mole/ratio) copolycarbonate
**BisAPc - Bisphenol A - Polycarbonate

EXAMPLES 9–16

Examples 9–16 illustrate the effect of the length of the reinforcing fiber, the type of the fiber and the type of the matrix polymer on the heat release tests. The composites

TABLE II

| Example | 9 | 10 | 11 | 12 | 13 | 14 | 15 | 16 |
|---|---|---|---|---|---|---|---|---|
| Matrix Polymer | Polyaryl-sulfone | Polyaryl-solfone | Polyaryl-sulfone | Polyaryl-sulfone | Polyaryl-sulfone | Polypropylene | Polyproylene | Polypropylene |
| Reinforcing Fiber | carbon | carbon | glass | staple nylon | Kevlar ® | staple nylon | Kevlar ® | glass |
| Length of the fibres (inches) | 0.125 | 1.0 | 0.1875 | 0.5 | 0.125–0.25 | 0.5 | 0.125–0.25 | 0.1875 |

TABLE II-continued

| Example | 9 | 10 | 11 | 12 | 13 | 14 | 15 | 16 |
| --- | --- | --- | --- | --- | --- | --- | --- | --- |
| Density of the panel (g/cc) | 0.24 | 0.26 | 0.23 | 0.21 | 0.24 | 0.24 | 0.22 | 0.23 |
| Thickness of the panel (inches) | 0.17 | 0.121 | 0.113 | 0.038 | 0.077 | 0.89 | 0.166 | 0.115 |
| 2 min THR (kW-min/m$^2$) | 37.6 | 126 | 45.9 | 170.4 | 66.0 | >145* | 174.6 | 242.4 |
| MRHR (kW/m$^2$) | 41.6 | 81.9 | 32.3 | 186.6 | 56.0 | off scale | 119.9 | 191.8 |

*Sample from out of control

What is claimed is:

1. A process for preparing a low heat release, low density, fiber-reinforced composite comprising a thermoplastic polymer matrix, having a void volume of from about 20 to about 90 percent, comprising: (a) heating a densified fiber-reinforced polymer sheet comprising the thermoplastic polymer matrix with a thermoplastic skin layer laminated on each major surface thereof, to a temperature above the softening temperature of the thermoplastic polymer matrix, whereby the sheet is expanded in a direction perpendicular to that of a plane defined by the sheet, and (b) cooling the expanded sheet below the softening temperature thereof to form a low heat release, low density, fiber-reinforced composite having a thermoplastic skin layer laminated on each major surface thereof, wherein (i) said thermoplastic polymer matrix is selected from the group consisting of polyarylsulfone, polyethersulfone, polyetheretherketone, polyetherketoneketone, a copolycarbonate of 4,4'-thiodiphenol and at least one member of the group consisting of bisphenol A, 9,9-bis(4-hydroxyphenyl) fluorene, and 1,1-bis(4-hydroxyphenyl)-1-phenyl ethane, a copolycarbonate of bisphenol A and 9,9-bis(4-hydroxyphenyl) fluorene, 1,1-bis(4-hydroxyphenyl)-1-phenyl ethane polycarbonate, bisphenol A polycarbonate, and polyetherimide; and (ii) distributed throughout said matrix are reinforcing fibers from about 10 to 70 percent by weight of the sheet, wherein said fibers are randomly oriented in two dimensions substantially in the plane defined by said sheet and have an average length less than about 0.5 inches, and an aspect ratio of at least about 40.

2. The process of claim 1, wherein matrix thermoplastic polymer has Limited Oxygen Index of greater than 23.

3. The process of claim 1, wherein the composite has maximum rate of heat release of less than 65 kW/m$^2$ and two minute total heat release of less than 75 kW/min/m$^2$.

4. The process of claim 1, wherein the matrix thermoplastic polymer is polyarylsulfone.

5. The process of claim 1, wherein the reinforcing fibers are carbon.

6. The process of claim 5, wherein the length of the fiber is from about 0.125 to about 0.25 inches.

7. The process of claim 6, wherein the weight percent of the fibers is about 50 percent by weight of the composite.

8. The process of claim 1, wherein the reinforcing fibers are glass.

9. The process of claim 8, wherein the thermoplastic polymer of the skin layer is polyvinylidene fluoride.

10. The process of claim 4, wherein the thermoplastic polymer of the skin layer is polyethersulfone.

11. A process for preparing a low heat release, low density, fiber-reinforced composite comprising a thermoplastic polymer matrix, having a void volume of from about 20 to about 90 percent, comprising: (a) heating a densified fiber-reinforced polymer sheet comprising the thermoplastic polymer matrix to a temperature above the softening temperature of the thermoplastic polymer matrix, whereby the sheet is expanded in a direction perpendicular to that of a plane defined by the sheet, (b) cooling the expanded sheet below the softening temperature thereof to form a low heat release, low density, fiber-reinforced composite and (c) laminating a thermoplastic skin layer on each major surface thereof, wherein (i) said thermoplastic polymer matrix is selected from the group consisting of polyarylsulfone, polyethersulfone, polyetheretherketone, polyketoneketone, a copolycarbonate of 4,4'-thiodiphenol and at least one member of the group consisting of bisphenol A, 9,9-bis(4-hydroxyphenyl) fluorene, and 1,1-bis(4-hydroxyphenyl)-1-phenyl ethane, a copolycarbonate of bisphenol A and 9,9-bis(4-hydroxyphenyl) fluorene, 1,1-bis(4-hydroxyphenyl)-1-phenyl ethane polycarbonate, bisphenol A polycarbonate, and polyetherimide; and (ii) distributed throughout said matrix are reinforcing fibers from about 10 to 70 percent by weight of the sheet, wherein said fibers are randomly oriented in two dimensions substantially in the plane defined by said sheet and have an average length less than about 0.5 inches, and an aspect ratio of at least about 40.

12. The process of claim 11, wherein the thermoplastic polymer of the skin layer is polyethersulfone.

13. The process of claim 12, wherein the matrix thermoplastic polymer is polyarylsulfone.

14. The process of claim 11, wherein the reinforcing fibers are carbon.

15. The process of claim 14, wherein the weight percent of the fibers is about 50 percent by weight of the composite.

16. The process of claim 15, wherein the length of the fiber is from about 0.125 to about 0.25 inches.

17. The process of claim 11, wherein the reinforcing fibers are glass.

18. The process of claim 17, wherein the thermoplastic polymer of the skin layer is polyvinylidene fluoride.

* * * * *